United States Patent
Brankovic et al.

(10) Patent No.: US 7,142,812 B1
(45) Date of Patent: Nov. 28, 2006

(54) WIRELESS TRANSMISSION SYSTEM

(75) Inventors: Veselin Brankovic, Stuttgart (DE); Dragan Krupezevic, Stuttgart (DE); Mohamed Ratni, Stuttgart (DE); Hamid Amir-Alikhani, Stuttgart (DE); Kenichi Kawasaki, San Diego, CA (US); Kazuji Sasaki, Tokyo (JP); Keiji Fukuzawa, Tokyo (JP)

(73) Assignees: Sony Deutschland GmbH, Cologne (DE); Sony Corporation, Tokyo (JP); Sony Electronics Inc., Park Ridge, NJ (US)

(*) Notice: Subject to any disclaimer, the term of this patent is extended or adjusted under 35 U.S.C. 154(b) by 0 days.

(21) Appl. No.: 09/593,178

(22) Filed: Jun. 13, 2000

(51) Int. Cl.
*H04B 7/00* (2006.01)

(52) U.S. Cl. ............... 455/41.2; 455/422.1; 455/414.2
(58) Field of Classification Search ............... 455/41.2, 455/418, 419, 420, 88, 406, 407, 408, 562, 455/556, 557, 422.1, 414.2, 35, 41; 709/219, 709/217
See application file for complete search history.

(56) References Cited

U.S. PATENT DOCUMENTS

| | | | | | |
|---|---|---|---|---|---|
| 4,414,550 | A | * | 11/1983 | Tresselt | 343/700 MS |
| H288 | H | * | 6/1987 | Gutleber | 342/367 |
| 4,940,990 | A | * | 7/1990 | Kharadly et al. | 343/773 |
| 5,371,738 | A | * | 12/1994 | Moelard et al. | 455/437 |
| 5,434,859 | A | * | 7/1995 | Levardon | 370/468 |
| 5,770,304 | A | * | 6/1998 | Nakamura et al. | 428/328 |
| 5,842,130 | A | * | 11/1998 | Oprescu-Surcobe et al. | 455/456 |
| 5,909,652 | A | * | 6/1999 | Ishikawa et al. | 455/558 |
| 6,000,606 | A | * | 12/1999 | Dethloff | 235/375 |
| 6,002,918 | A | * | 12/1999 | Heiman et al. | 340/7.38 |
| 6,218,987 | B1 | * | 4/2001 | Derneryd et al. | 342/373 |
| 6,310,587 | B1 | * | 10/2001 | Villino et al. | 343/753 |
| 6,326,918 | B1 | * | 12/2001 | Stewart | 342/457 |
| 6,326,926 | B1 | * | 12/2001 | Shoobridge et al. | 455/432 |
| 6,341,133 | B1 | * | 1/2002 | Kawamoto et al. | 370/401 |
| 6,349,217 | B1 | * | 2/2002 | Honcharenko et al. | 455/562 |
| 6,360,075 | B1 | * | 3/2002 | Fischer et al. | 348/14.01 |
| 6,370,377 | B1 | * | 4/2002 | Take et al. | 455/432.1 |
| 6,452,498 | B1 | * | 9/2002 | Stewart | 340/573.1 |

FOREIGN PATENT DOCUMENTS

JP          09233093 A    *  9/1997
WO       WO 93/01665    *  1/1993

OTHER PUBLICATIONS

JP 09233093 A (English abstract only) pp. 1–2 included.*
A. Nesic et al., "Toward New Generation of the High Data Rate In–door Communication Systems–System and Key RF Technologies," TELSIKS'99, 13–15, Oct. 1999, Nis, Yugoslavia.
Leandro Fernandes, "Developing a System Concept and Technologies for Mobile Broadband Communications," IEEE Personal Communications, Feb. 1995, pp. 54–59.

* cited by examiner

*Primary Examiner*—Sonny Trinh
(74) *Attorney, Agent, or Firm*—Oblon, Spivak, McClelland, Maier & Neustadt, P.C.

(57) ABSTRACT

A wireless transmission system operating in a 60 GHz frequency range comprises fixed hubs (public download server) (2) and mobile terminals (1). The fixed hubs (2) have antennas (4) with a wide angle beam shape. The mobile terminals (1) have antennas (3) with a narrow angle beam shape. The fixed hubs (public download server) (2) are connected by means of a connection line (5) to an information source such as a network backbone or a main server.

20 Claims, 6 Drawing Sheets

Side View

Top View

A

B

Top View

Side View

A

B

WIRELESS TRANSMISSION SYSTEM

The present invention relates to a wireless transmission system operating in a 60 GHz range which can be used for open public applications.

The data rate demand for wireless systems is permanently growing due to the variety of now applications. To meet the increased demand of high data rate applications, a new generation of the wireless communication systems is targeted. Due to the common spectrum shortage, the natural way of looking at higher frequencies like those in higher microwave and lower millimeter-wave bands is recommended. Recently the spectrum in a 60 GHz range (a 59 to 64 GHz band) has been allocated for non-licensed applications worldwide. Other non licensed bands are for example the 2.4 GHz ISM-band, the 5.8 GHz band and the 24 GHz band.

Background information can be found in L. Fernandes, "Developing a System Concept and Technologies for Mobile Broadband Communications", IEEE Personal Communication Magazine, February 1995.

The following European patent applications of Sony International (Europe) GmbH relate to technologies which can be applied for a transmission in said 60 GHz non-licensed frequency band:

EP 0 969 602 A1 relating to a TX/RX structure for a dual frequency mode,

EP 1 006 668 A1 relating also to a dual frequency band transceiver,

EP 0 889 543 A1 relating to a wideband printed dipole antenna for microwave and millimeter-wave applications, EP 0 920 074 A1 relating to a circular polarized planar printed antenna concept with shaped radiation pattern, EP 0 889 542 A1 relating to a wideband printed phase array antenna for microwave and millimeter-wave applications.

In view of the above-cited prior art it is the object of the present invention to propose a wireless transmission system designed for a transmission of data in the 60 GHz range taking advantage of the fact that said 60 GHz range is a non-licensed frequency band and of the specific propagation properties (high attenuation, oxygen absorption).

According to a first aspect of the present invention a wireless transmission system designed for the transmission of data in the 60 GHz range comprises a public download server connected to a network backbone or a main server and a mobile terminal provided with a narrow beam antenna.

The communication range can be limited to 20 meters or less.

The public download server can be connected to a broadband data highway and/or a main server by means of an optical cable.

The public download server can be connected to a broadband data highway or a main server by means of a wireless point-to-point connection.

The public download server can be connected to a broadband data highway or a main server by means of a point-to-multipoint wireless local loop connection.

The public download server and the mobile terminal can be designed for a dual frequency operation, one transmission frequency being in the 60 GHz range and a second transmission frequency being an intermediate frequency in a range below the 60 GHz range.

The public domain server can be provided with a wide angle beam antenna.

The public domain server can be provided with an antenna having a kidney shaped beam in cross section.

According to a further aspect of the present invention a wireless transmission system designed for the transmission of data in the 60 GHz range is proposed, the system comprising a teed hub provided with a wide angle beam antenna and a mobile terminal provided with a narrow beam antenna.

According to a still further aspect of the present invention a wireless transmission system designed for the transmission of data in the 60 GHz range is provided, the system comprising at least two mobile terminals respectively provided with a narrow angle antenna for communication with each other.

According to a still further aspect of the invention a wireless transmission system is proposed comprising a plurality of public access server and at least one mobile terminal, The mobile terminal is designed to upload/download content from the public access server by means of a wireless transmission and the public download server all operate with the same transmission frequency in a non-licensed frequency band.

The communication between the mobile terminal and respectively a public access server is preferably free of charge. The uploading/downloading of content can be charged to the user of the mobile terminal.

Preferably there is no hand-over between adjacent public access server.

According to a still further aspect of the invention, a method for uploading and/or downloading content from a public access server to/from mobile terminals over an air interface is proposed. The air interface uses a non-licensed frequency band and the transmission itself is free of charge. The user of a mobile terminal is charged for uploading/downloading content. Preferably a service provider is owner of the public access server.

The public access server can be installed in a large hall environment, in public vehicles, facing sidewalls, and/or at gas stations or traffic lights.

Further advantages, features and objects of the present invention will become evident for the man skilled in the art when reading the following detailed description of embodiments taken in conjunction with the figures of the enclosed drawings.

Figure 1:
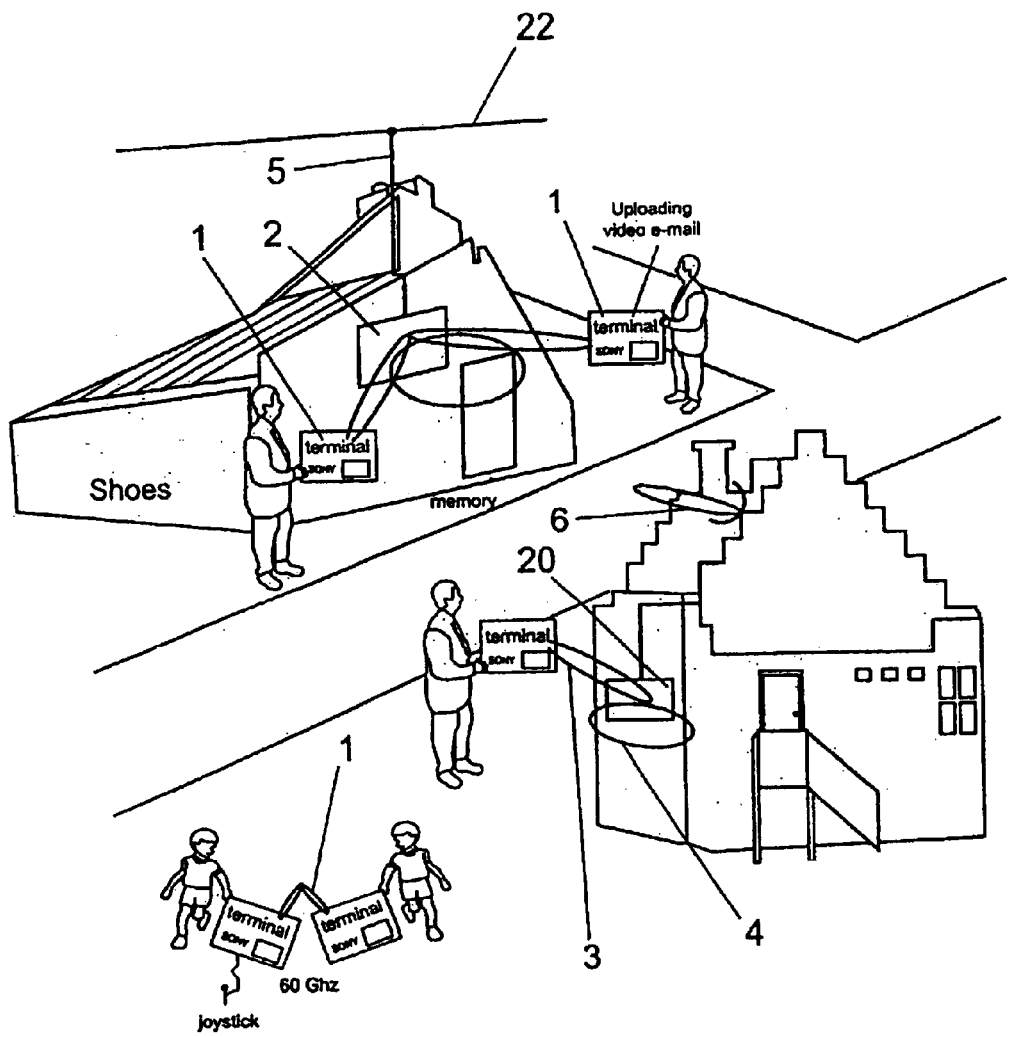
FIG. 1 shows a 60 GHz public access system application scenario.
Figure 2:
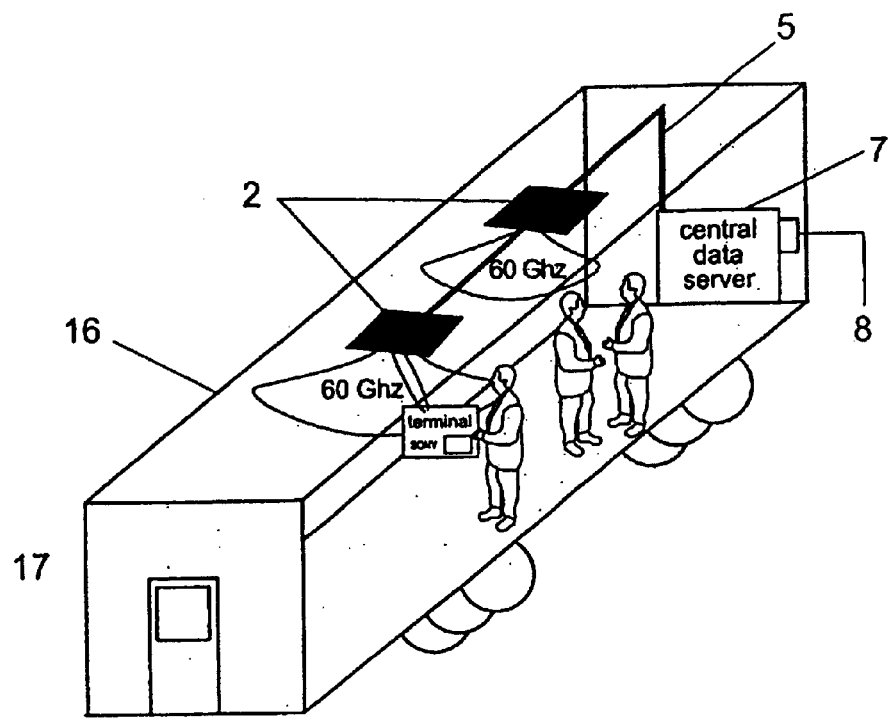
FIG. 2 shows a 60 GHz public access system application scenario applied for underground and trains.
Figure 3:
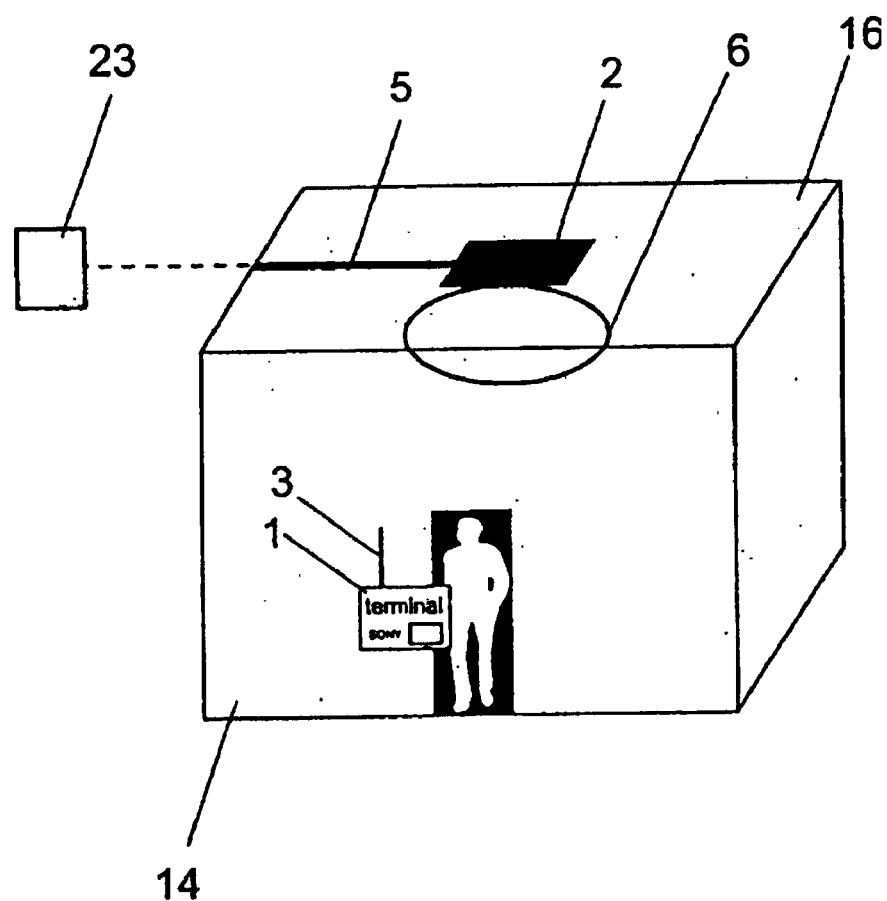
FIG. 3 shows a 60 GHz public access system application scenario for large rooms (airport, train station, . . . )

With reference to FIGS. 1, 2 and 3 different environmental scenarios for the application of the present invention will be explained.

Generally the present invention is targeting solutions for urban areas like town environments shown in FIG. 1. Users having a mobile terminal 1 can communicate by means of a wireless transmission in the 60 GHz range and optionally other ranges below said 60 GHz range with fixed hubs 2. The fixed hubs 2 are public access server. Furthermore, two mobile terminals 1 can communicate with each other in the 60 GHz range for example to perform wireless games.

The communication of a mobile terminal 1 with the fixed hub 2 can be used, for example for a fast downloading of video within a short time period on a storage unit (for example hard disc) within the mobile terminal 1. Alternatively, contents of news information centers can be downloaded or video e-mail can be exchanged with the fixed hub 2.

Note that the fixed hubs 2 are respectively linked to an information source such as a broadband data highway 22 (for example a ATM fixed backbone) or a main information server 23 by means of a fixed connection S or a wireless transmission 6. Note that the mobile terminals 1 are respectively provided with an antenna means 3 with a narrow shaped beam. The fixed hubs 2 are respectively provided with an antenna 4 having a wide angle beam shape. The communication range between respectively a fixed hub 2 and a mobile terminal 1 or between two mobile terminals 1 is for example about 20 meters maximum.

FIG. 2 shows the application of a wireless transmission system according to the present invention in public transportation means such as underground or trains. On the ceiling 16 of a wagon 17 fixed hubs 2 are provided. These hubs are respectively connected by means of a connection line S to a central data server 7. Users within the wagon 17 having a mobile terminal 1 can communicate, with the fixed hubs 2 while commuting in the wagon 17. Furthermore a gateway 8 having an interface function is provided which is connected to the central data server 7 of the wagon 17 and which serves for updating the content of the central data server 7.

FIG. 3 shows the application of the present invention in public indoor environment such as airports, railway stations, department and convenient stores. Generally this application relates to the wireless communication within a large hall 19. Again, a fixed hub 2 connected to an information source by means of a connection line 5 is provided on the ceiling 16 of the hall 19. The user can communicate with the fixed hub 2 by means of the antenna 3 of the mobile terminal 1 of the user.

The fixed hubs 2 being fixed axis stations for the communication are preferably public download servers (PDS). The mobile terminals will be distinguished in so-called universal terminals (UT) and terminal with the reduced functionality (TRF).

The fixed hubs and preferably the PDS units can be connected to a information source by different means:

According to a first alternative the PDS units are connected by means of a fixed connection 5 (for example a optical cable) to a broadband data highway 22, (for example an ATM fixed backbone) or a main information server 23 containing the source of information.

According to a second alternative the PDS unit is connected by means of a point-to-point fixed wireless connection 6 to a broadband data highway 22 or a main information server 23 containing the source of information.

According to a still further alternative the PDS unit is connected by a point-to-multipoint wireless local loop (WLL) connection to the broadband data highway 22 or a main information server 23 containing the source of information.

The fixed hub or PDS unit 2 contains a memory block (reference 20 in FIG. 1) which may be updated by placing a new (updated) memory block in the PDS unit by a service provider. This can be done for example by placing a memory stick with a large memory.

Figure 4:
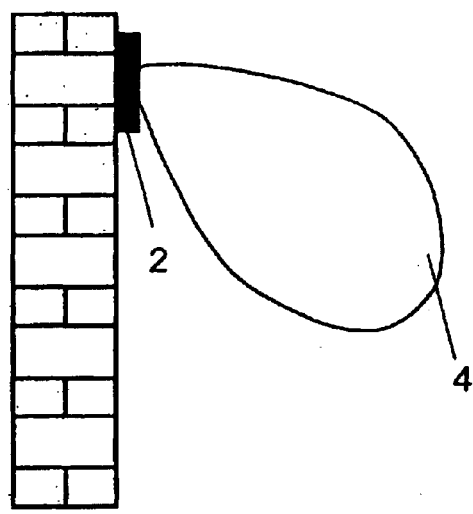
FIG. 4 shows public download server antenna diagram requirements for open public access applications (streets, etc.)
Figure 4:
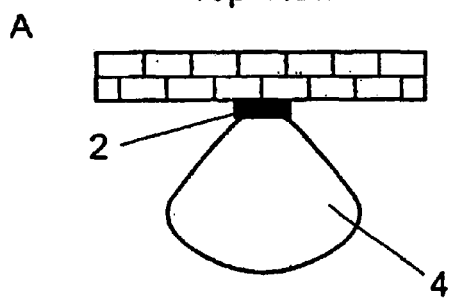
Figure 4:
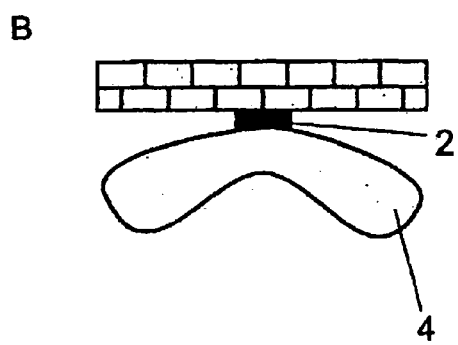
Figure 5:
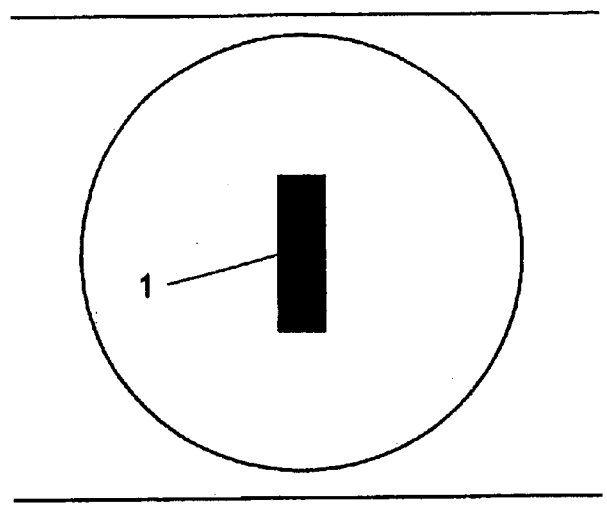
FIG. 5 shows public download server antenna diagram requirements for trains, underground and large room environments.
Figure 5:
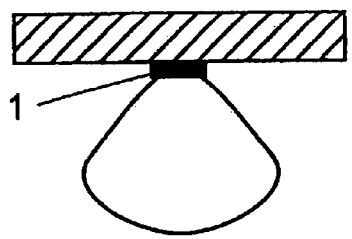
Figure 5:
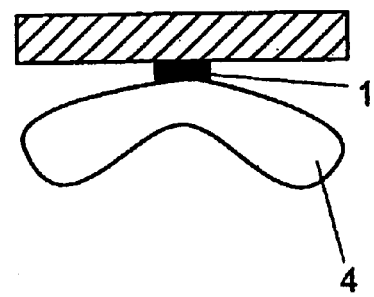

With reference to FIGS. 4 and 5 the wide angle radiation beam of the antennas 4 of the fixed hubs 2 will be explained. The mobile terminals 1 generally have a narrow angle beam shape.

The radiation beams of the antennas 4 of the fixed hubs 2 generally have linear or circular polarization.

FIG. 4 shows PDS antenna diagram requirements for street applications. For this scenario the radiation beam of the fixed hubs (PDS) 2 can be like alternatively shown in FIGS. 4a and 4b in a top view, wherein the uniform coverage provided by the alternative according to FIG. 4b is preferred. The radiation beam according to the embodiment of FIG. 4b can be described as having a kidney like cross section when seen from above. Besides a uniform coverage this solution offers an extension of the communication range. Therefore, when using the alternative as shown in FIG. 4b for a larger communication distance the antenna gain is larger and for a smaller communication distance the antenna gain is smaller. This allows an optimization of the transmission power and therefore a reduction of the requirements on the AGC (autocratic gain control) of the receiver in the mobile terminal 1.

FIG. 5 shows PDS antenna diagram requirements for train, underground and/or large hall environments in which the public download server (PDS) is preferably placed on the ceiling. Preferably the radiation pattern having a top view according to FIG. 4b is preferred, as it offers uniform coverage solution and an extension of the communication range.

The data rate for the communication of the PDS units with their information source (data highway or main server) may be smaller compared to the communication rate between the fixed hubs (PDS) and the mobile terminals or between two mobile terminals. Optionally the PDS unit can be only a video server or it is connected to a main video server and provides only content coming from the main video server.

Figure 6:
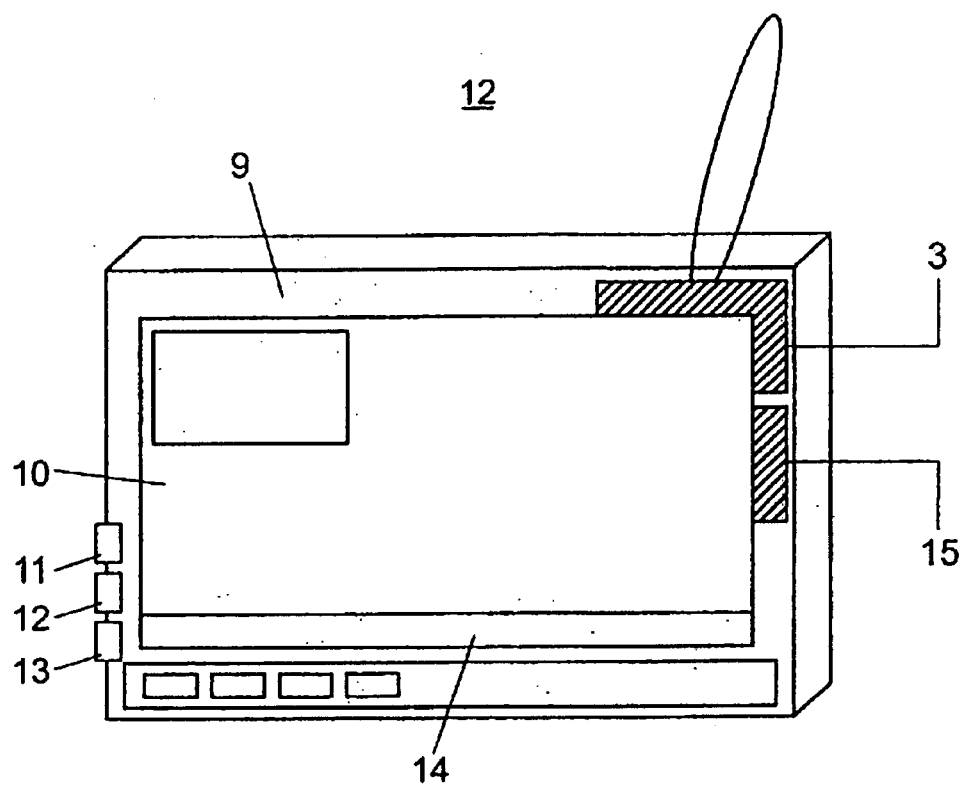
FIG. 6 shows a universal terminal as one embodiment of a mobile terminal according to the present invention.

With reference to FIG. 6 a mobile terminal 1 according to the present invention will be explained. The mobile terminals 1 respectively have an antenna 3 providing a "pencil" like team shape (high gain antenna) with linear or circular polarization.

The mobile terminal 1 can be provided with a camera 9, an optional front end for other wireless systems (for example bluetooth 21), a screen 10 capable of DV playback, a microphone 11, headphone sockets 12, a connection plug 13 for game joysticks, a touch screen 14 and a memory 15 able to store more than one full-time high-quality video.

The antenna 3 can be integrated in a front end consisting of the highway antenna 3 and a RF front end.

Additional integrated (or output to external) wireless connection radio front ends can be provided having an operation frequency lower than 60 GHz, whereby the operation frequency is not an intermediate frequency of the 60 GHz front end.

FIG. 6 shows a mobile terminal 1 with maximum functionality. Furthermore, a terminal with reduced functionality (TRP) can be used. A TRF has only content decoder, control units and man/machine interfaces as for example a portable MP3 player or a portable DVD player. As a further alternative the TRF may only have a control unit and a man/machine interface as for example a simple display or an earphone.

The communication data rate between a PDS unit and a mobile terminal and between two mobile terminals, respectively, exceeds 50 Mbit/s (user data rate) and is preferably larger than 100 Mbit/s. In an ideal case the communication data rate is n·100 Mbit/s, whereby n is an integer larger than 1. Lower data rate modes can also be provided especially in conjunction with the terminal with reduced functionality.

Both TDMA and FTMA access is allowed. The modulation schemes can be chosen arbitrarily as long as they can cope with very high data rates. The modulation scheme can be for example OFDM based and optionally the bandwidth is a multiple of the 20 MHz OFDM bandwidth.

All fixed hubs and mobile terminals are optionally designed to have an intermediate frequency in the 5 GHz range (non-licensed and ISM industrial scientific medical band) to provide a dual frequency operation In the 5 GHz and 60 GHz range.

Optionally all fixed hubs and mobile terminals are designed to have an intermediate frequency in the 2,4 GHz range (ISM band) to provide a-dual frequency operation in the 2,4 GHz and 60 GHz range.

Networking and Protocols

Communication protocol requirements between PDS and UT (or TRF), or between UT (or TRF) and other UT (or TRF):

- has LESS complexity compared to classic WLAN protocols, or classic Cellular system protocols,
- it may allowed only simple download in restricted operation scenario,
- they do not necessarily support handover,
- they are not necessarily the same as communication protocols between the PDS unit and data highway or main data server, and by the rule they have less complexity,
- PDS unit may have a means to terminate more complex communication protocol between PDS and data highway and communicate with BUT (or TRF) by the simpler protocol definition,
- Optionally, protocol between PDS and UT (or TRF) supports MPEG streaming all more than one MPEG standard,
- Optionally protocol stack between PDS and UT (or TRF) supports IP.

Advantages of the Proposed System Compared to Know Systems

1. Advantages of the proposed public systems are:
   - usage of the non-licensed band in 59–64 GHz range offering, a large spectrum and very large data rates, they are not available to provide to the users,
   - due to the non-licensed band, there is no need to pay operation licenses locally, so that everyone may be operator, and cover those areas, which are for operate consider as profitable, mainly only common standard,
   - due to very large data rates available a new prospective of applications are opened which are fully complementary to so-called 3G and 4G mobile communication systems, so proposed systems may be considered as a new business opportunity, also for those companies making 2G, 3G and in future 4G business.
   - Due to the high frequency of the operation the total front end size and antenna size may be very small and very easy to be integrated in various types of terminals: beginning from current PDA types of terminals, through so-called 2G and 3G to the future UT (or TRF) terminal,
   - Due to the high frequency and high attenuation, small transmission power, and specified UT antenna pattern, as well as large oxygen absorption frequency re-use may be easily adopted, so there is almost unlimited possibility of providing very large wireless data rates in very small environments, Density and capacity of the system is almost unlimited, in contrast to so-called 3G and future 4G systems.
   - Proposed concept does not need to have smart backbone infrastructure like cellular systems, it is much more simpler, there is no handover between different fixed hubs and the same transmission frequency can be reused efficiently,
   - Proposed concept has much lower complexity compared to the WLAN (wireless local area network) approach.

Potential Applications

The basic business related ideas are:
a) wireless communication access is free of charge,
b) payment only for specific content (e.g. video, audio, newspapers, game downloading, gaming),
c) the key operation mode is downloading,
d) sending and receiving private information (E-mails, video E-mails, documents, profiles) is in principle free of charge,
e) gaming from one UT to another UT, as well as gaming from, UT with PDS is free of charge,
f) some charges may be applied for real time, delay sensitive, applications like video and audio telephony.

Application Examples:
a) User downloads a high quality video content from PDS within couple of minutes (data rates larger than 100 Mbit/s). The data is memorized on the memory entity (e.g. miniature hard disc or future memory stick), which is placed within the UT terminal, After that the user may playback the content where he wants, and in time he wants, independently from further wireless access availability. The payment of the content goes by personal identification process via scrambled information sent by UT to PSD.
b) A user passes near the PSD and pickup in walking by pressing the button at UT, within the seconds wanted newspaper or magazine, and read it where he wants, and when he wants, independently from further wireless access availability. The payment of the content goes by, personal identification process via scrambled information sent by UT to PSD.
c) Sitting in the underground user downloads (payment obliged) content he wants, but in the same time he may chose one of a plurality of free of charge contents provided by the underground service company. Underground service company will have satisfied users, and take a payment for advertisement. Advertisement is included in free of charge content.
d) User passes near the PSD and pickup in walking by pressing the button at UT, (within the seconds) his personal information content. For example he takes all E-mails, or Video/Audio E-mail, or documents sent to him. In the same time by pressing the button he sends to PSD his E-mails, video E-mails or other content to PSD. PSD takes this information and sends it further via internet. This service is free of charge, but make a majority of people interested to purchase UT, and after that to take a proprietary content by wireless 60 GHz system.
e) User stands in front of PSD and make a classic audio or video telephony using UT, which is through fast internet connection further in real time provided to the addressed user. This service is not free of charge, but make a direct competition to mobile network service providers (3G). Due to the lower system cost and no infrastructure in background, the final price may be highly competitive.

f) User has UT with play station capability and perform gaming against the PSD server during traveling by underground, by means of wireless. This service may be in underground or in train free of charge, but on the street or waiting in airport hall it may be charged.

g) User has UT with play station capability and play against other user having UT with play station capability by wireless 60 GHz broadband link. This service is free of charge.

h) User has UT and standing close to PSD is downloading internet information during waiting for his bus. This service is free of charge.

i) User is driving the car and during waiting for the green light he is downloading content of the interest, by using 60 GHz communications j) User is driving through "Drive-In" restaurant or fuel tank station and during the waiting time for obtaining services, he is connecting to 60 GHz PDS and picks up specific content.

k) During a visit to the general store or airport (large indoor environment with public access) user takes content from 60 GHz PDS unit. Large store and for example airport are offering free of charge navigation service for their environments and entertainment program. Content provided for user may be also free of charge, but aligned with commercials, coming from owner of the PSD unit.

l) By giving to user free of charge UT or TRF, to obtain only selected (limited by provider of the free terminal) content, m) While buying some snacks in small 24-hours convenience store, user picks up some information/entertainment content (using 60 GHz means) from indoor PDS unit to his UT or TRF.

What is claimed is:

1. A wireless transmission system, comprising:

a plurality of public access servers and at least one mobile terminal, wherein the mobile terminal is designed to upload/download content from one of said public access servers by means of a wireless transmission and the public download servers all operate with the same transmission frequency in a non-licensed band;

wherein each public access server downloads/uploads content to mobile terminals only within a small localized area; and wherein there is no hand-over between adjacent public access servers.

2. The wireless transmission system according to claim 1, wherein the communication between the mobile terminal and respectively a public access server is free of charge.

3. The wireless transmission system according to claim 1, wherein the uploading/downloading of content is charged to the user of the mobile terminal.

4. The wireless transmission system according to claim 1, wherein said small localized area is within 20 meters of each public download server.

5. A method for uploading and/or downloading content from public access servers to/from mobile terminals over an air interface, wherein the air interface uses a non-licensed frequency band and the transmission itself is free of charge, wherein each public access server downloads/uploads content to/from a mobile terminal within a small localized area in the vicinity of that public access server, and wherein there is no hand-over between adjacent public access servers.

6. The method according to claim 5, wherein the user of a mobile terminal is charged for uploading/downloading content.

7. The method according to claim 5, wherein a service provider is owner of at least one public access server.

8. The method according to claim 5, wherein the non-licensed frequency band is a 60 GHz band.

9. The method according to claim 5, wherein the public access server is installed in a large hall environment.

10. The method according to claim 5, wherein the public access server is installed in public vehicles.

11. Method according to claim 5, wherein the public access server is installed facing sidewalls.

12. The method according to claim 5, wherein the public access server is installed at gas stations or traffic lights.

13. A wireless transmission system comprising:

a fixed hub connected to an information source, said fixed hub provided with a wide angle beam antenna;

a hand-held mobile terminal provided with a narrow beam antenna;

wherein content from said information source is downloaded to said mobile terminal via said fixed hub only within a small localized area of said fixed hub; and wherein said fixed hub is one of a plurality of fixed hubs; and there is no handover between said fixed hubs.

14. The wireless transmission system according to claim 13, wherein the fixed hub is provided with an antenna with a kidney shaped beam in cross-section.

15. The wireless transmission system according to claim 14 wherein said antenna is mounted on a ceiling, and said kidney shaped beam has a local minimum level in said cross section in a direction opposing said ceiling.

16. The wireless transmission system according to claim 13 wherein said small localized area is within 20 meters of said fixed hub.

17. The wireless transmission system according to claim 13, wherein said fixed hub is further adapted to upload information from said mobile terminal.

18. The wireless transmission system according to claim 13, wherein said system is designed for the transmission of data in the 60 GHz range.

19. The wireless transmission system according to claim 13, wherein said information source is a broadband data highway, and said content includes video content.

20. The wireless transmission system according to claim 13, wherein said content includes contents of news information centers.

* * * * *